V. P. HARRIS.
OIL RESERVOIRS FOR BURNERS OR CARBURETERS.
No 195,872. Patented Oct. 2, 1877
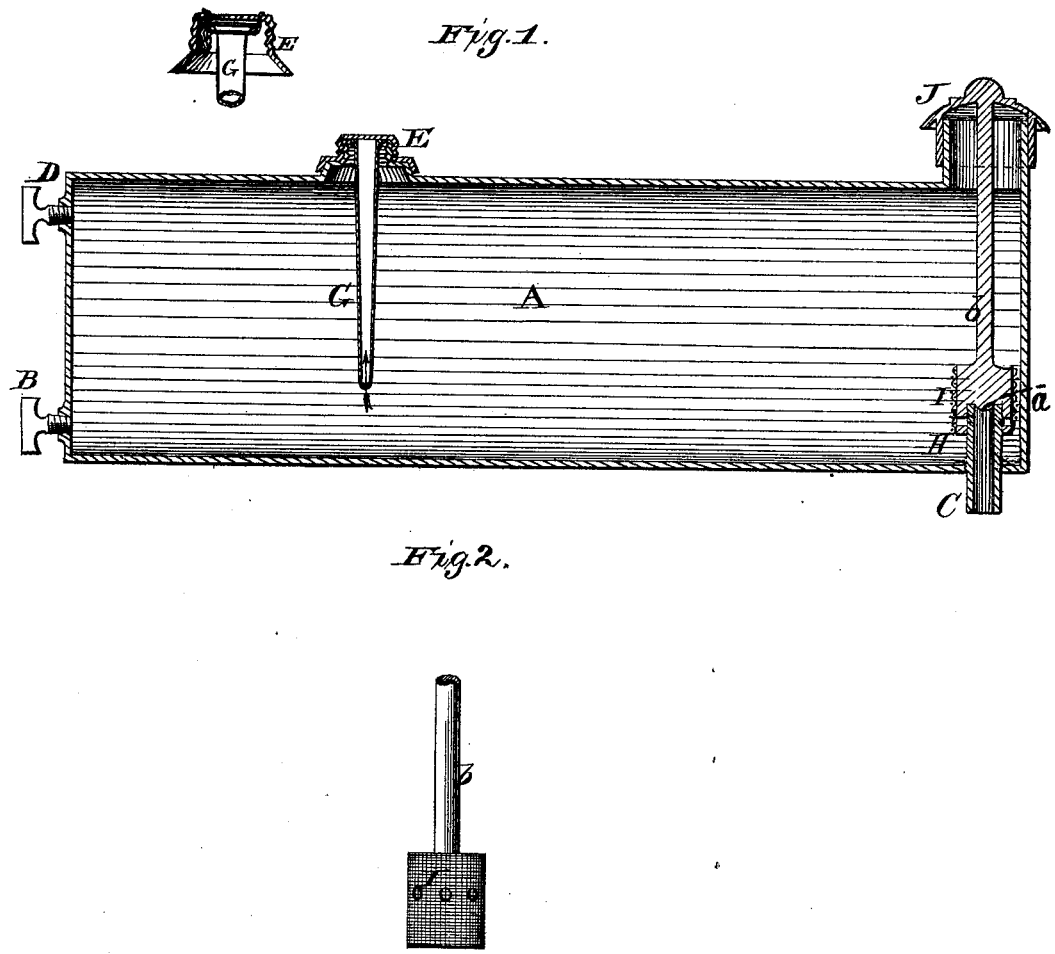

UNITED STATES PATENT OFFICE.

VENENDO P. HARRIS, OF GREENSBURG, INDIANA.

IMPROVEMENT IN OIL-RESERVOIRS FOR BURNERS OR CARBURETERS.

Specification forming part of Letters Patent No. 195,872, dated October 2, 1877; application filed August 16, 1877.

*To all whom it may concern:*

Be it known that I, VENENDO P. HARRIS, of Greensburg, in the county of Decatur, and in the State of Indiana, have invented certain new and useful Improvements in Oil-Reservoirs; and do hereby declare that the following is a full, clear, and exact description thereof, reference being had to the accompanying drawings, and to the letters of reference marked thereon, making a part of this specification.

The nature of my invention consists in the construction and arrangement of a reservoir for supplying light oils, benzine, naphtha, gasoline, or other hydrocarbon oils for vapor-burners, or for the manufacture of gas for illuminating purposes, as will be hereinafter more fully set forth.

In order to enable others skilled in the art to which my invention appertains to make and use the same, I will now proceed to describe its construction and operation, referring to the annexed drawing, in which—

Figure 1 is a longitudinal vertical section of my improved reservoir. Fig. 2 is a detached view of a part thereof.

A represents one form of the reservoir, made in cylindrical shape, in which the oil is stored. Near the bottom, or in the bottom, of this reservoir is a stop-cock, B, to be opened for drawing off any low-grade oil, water, or other foreign matter that may have settled in the bottom of the reservoir, and thereby keeping the same from rising high enough to flow into the tube C. This tube C extends high enough up to be at all times above the grade of 80° gravity, which will insure a brilliant and continuous flame at all times. Near the top is a stop-cock, D, for drawing off the too highly inflammable oil or gases or floating substances as often as it may be deemed necessary.

The reservoir is to be graduated according to the capacity of the burner used, measured in feet, which will provide an index of the exact amount of oil necessary to put into the reservoir from time to time in order to insure the best results.

G represents a tapering glass index-tube, open at its lower smaller end, and loosely fastened at its upper end, by a wire or other means, to the under side of the screw-cap E, which covers the inlet-opening to the reservoir. This mode of fastening admits of the ingress and egress of air at the upper end of the tube, to allow the oil to enter the lower end of the tube. This index-tube will show at a glance just how much oil there is in the reservoir and the gravity of the oil being consumed.

In operation it will be understood that the oil passes slowly upward through the narrow orifice in the tube. By extracting the tube quickly, little or no oil can escape, and the amount of oil in the reservoir easily indicated.

The upper end of the outlet-tube C is covered by a strainer, H, through which the oil passes to said tube, preventing any foreign matter from getting into the tube. This strainer is attached to a cover, I, which has a stopper, a, projecting downward from its center, for closing the tube C when the reservoir is being filled, thus preventing any heavy oil, residuum, water, or other foreign substance from entering the tube while the oil is in commotion, caused by the oil being poured in.

The cover I is, by a rod, b, connected with a cap or screw, J, so that the stopper can be easily raised and lowered, as required.

Having thus fully described my invention, what I claim as new, and desire to secure by Letters Patent, is—

1. The glass index-tube G, loosely attached to the cap E, for the purposes herein set forth.

2. In an oil-reservoir, the combination of the outlet-tube C, with its inner end extending above the bottom of the reservoir, the perforated cover I, provided with central stopper a, the strainer H, connected to said cover, the rod b, and cap or screw J, all substantially as and for the purposes herein set forth.

In testimony that I claim the foregoing I have hereunto set my hand this 21st day of July, 1877.

VENENDO P. HARRIS.

Witnesses:
WARREN B. WILSON,
THOMAS M. MOZINGO.